(12) United States Patent
Kennedy

(10) Patent No.: US 6,822,994 B2
(45) Date of Patent: Nov. 23, 2004

(54) SOLID-STATE LASER USING YTTERBIUM-YAG COMPOSITE MEDIUM

(75) Inventor: Chandler J. Kennedy, Town and Country, MO (US)

(73) Assignee: Northrop Grumman Corporation, Redondo Beach, CA (US)

( * ) Notice: Subject to any disclaimer, the term of this patent is extended or adjusted under 35 U.S.C. 154(b) by 66 days.

(21) Appl. No.: 09/876,324

(22) Filed: Jun. 7, 2001

(65) Prior Publication Data

US 2002/0191663 A1 Dec. 19, 2002

(51) Int. Cl.[7] ................................................. H01S 3/07
(52) U.S. Cl. ............................. 372/66; 372/39; 372/40; 372/41; 372/70; 359/342; 359/343
(58) Field of Search ........................... 372/39, 40, 41, 372/66, 68, 70, 7, 72, 100, 103, 98, 107, 109, 71; 359/342, 343, 337.3, 324

(56) References Cited

U.S. PATENT DOCUMENTS

| | | | |
|---|---|---|---|
| 3,631,362 A | 12/1971 | Almasi et al. | |
| 3,986,130 A | 10/1976 | Soures et al. | |
| 4,084,883 A | 4/1978 | Eastman et al. | |
| 4,091,274 A | 5/1978 | Angelbeck et al. | |
| 4,225,826 A | 9/1980 | Lewis et al. | |
| 4,249,141 A | 2/1981 | Brown et al. | |
| 4,876,694 A | 10/1989 | Hughes | |
| 4,949,346 A | * 8/1990 | Kuper et al. | ................... 372/36 |
| 5,084,888 A | 1/1992 | Tajima et al. | |
| 5,084,889 A | * 1/1992 | Tajima | ......................... 372/39 |
| 5,138,628 A | 8/1992 | Pocholle et al. | |
| 5,239,549 A | 8/1993 | Tajima et al. | |
| 5,394,427 A | 2/1995 | McMinn et al. | |
| 5,563,899 A | 10/1996 | Meissner et al. | |
| 5,734,672 A | 3/1998 | McMinn et al. | |
| 5,852,622 A | 12/1998 | Meissner et al. | |
| 5,898,211 A | 4/1999 | Marshall et al. | |
| 5,913,108 A | 6/1999 | Stephens et al. | |
| 5,936,984 A | * 8/1999 | Meissner et al. | ............. 372/34 |
| 5,985,684 A | 11/1999 | Marshall et al. | |
| 6,014,393 A | * 1/2000 | Fulbert et al. | ................. 372/41 |
| 6,026,109 A | 2/2000 | Micke et al. | |
| 6,061,378 A | 5/2000 | Marshall et al. | |
| 6,094,297 A | * 7/2000 | Injeyan et al. | ............. 359/345 |
| 2002/0110164 A1 | * 8/2002 | Vetrovec | ...................... 372/36 |
| 2002/0118718 A1 | * 8/2002 | Honea et al. | .................. 372/71 |

OTHER PUBLICATIONS

Giesen et al.; "Advanced Tunability and High–Power TEM$_{00}$–Operation of the Yb:YAG Thin Disc Laser", *Optical Society of America*, vol. 10, pp. 280–284, 1997.

Bruesselbach et al.; "High–Power Side–Diode–Pumped Yb:YAG Laser", *Optical Society of America*, vol. 10, pp. 285–287, 1997.

* cited by examiner

Primary Examiner—Jerome Jackson
Assistant Examiner—Matthew Landau
(74) *Attorney, Agent, or Firm*—Jenkens & Gilchrist

(57) ABSTRACT

A laser device employs a laser slab having an ionic layer and a nonionic layer, joined through an optical-quality interface. The laser slab has a trapezoidal cross-section in a direction perpendicular to the optical-quality interface. Thermal conductivity away from the ionic layer is enhanced through the thinness of the ionic layer and through the use of a heatsink attached to the ionic layer. Optical power input through the nonionic layer and into the ionic layer is further increased through the use of the trapezoidal cross section.

20 Claims, 4 Drawing Sheets

SOLID-STATE LASER USING YTTERBIUM-YAG COMPOSITE MEDIUM

FIELD OF THE INVENTION

The present invention relates generally to laser media and more specifically to a composite medium for generating laser output.

BACKGROUND OF THE INVENTION

Laser systems using ion-doped yttrium aluminum garnet (YAG) as a lasing medium have achieved great popularity for their high-power output and the widespread availability of several ion-doped YAG compositions. Still, there is a constant desire to utilize newer and more effective lasing media. Ytterbium:YAG ("Yb:YAG") is a promising material for high power, high brightness, and high efficiency laser systems because of its small quantum defect between pump and lasing transitions. However, thermal management is difficult in a Yb:YAG system because of the low specific gain and high transparency threshold of Yb:YAG. Further, smaller-sized Yb:YAG lasing media, which allow for better thermal management, limit the amount of area of Yb:YAG available for optical pumping with laser diodes.

There exists a need for a lasing medium configuration which optimizes thermal management in a Yb:YAG while also taking advantage of the ability to optically pump Yb:YAG with increased amounts of optical energy to produce a high power, high brightness, and high efficiency laser system.

SUMMARY OF THE INVENTION

According to one embodiment of the present invention, a laser device having a trapezoidal cross-section with a nonionic base layer and an ionic layer attached thereto is optically pumped to produce laser output. The nonionic base layer can be a YAG layer and the ionic layer can be a layer of ion-doped YAG material, such as Yb:YAG. The trapezoidal cross-section results in a larger area for receiving optical energy from a laser diode array. Thus, higher outputs can be achieved.

The ionic layer used in the present invention may be kept thin in relation to its length and width, providing for efficient heat removal from the ionic layer.

The above summary of the present invention is not intended to represent each embodiment, or every aspect of the present invention. This is the purpose of the figures and detailed description which follow.

BRIEF DESCRIPTION OF THE DRAWINGS

Other aspects and advantages of the invention will become apparent upon reading the following detailed description and upon reference to the drawings.

Figure 1:
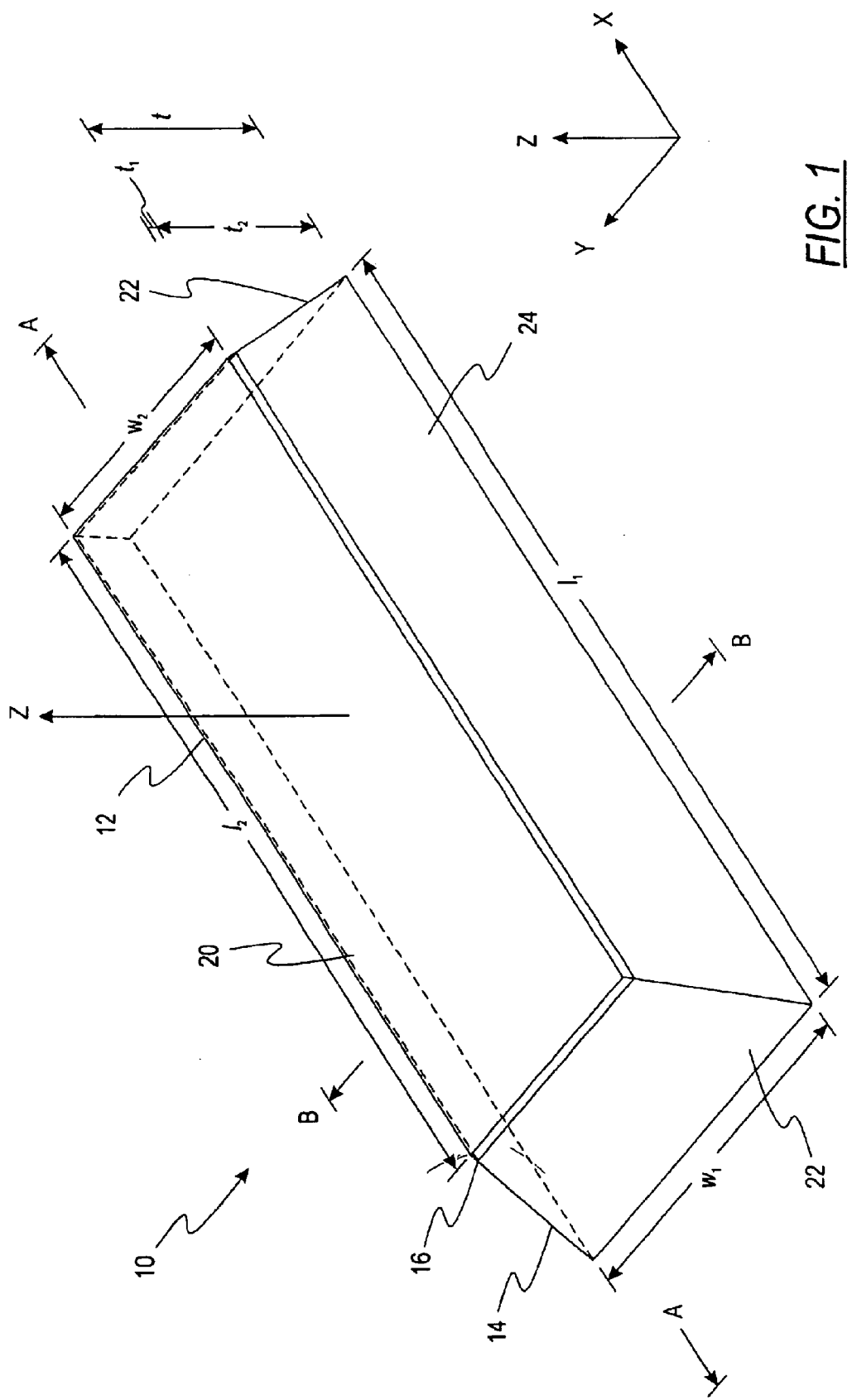
FIG. 1 is a perspective view of a laser slab according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the intent is to cover all modifications, equivalents, and alternatives falling within the spirit and scope of the invention as defined by the appended claims.

DETAILED DESCRIPTION OF THE INVENTION

FIG. 1 shows an arrangement for a laser slab 10 according to the present invention. The laser slab 10 contains two layers, an ionic layer 12 and a nonionic layer 14 with an optical-quality interface 16 disposed therebetween. The ionic layer 12 and the nonionic layer 14 may be joined through diffusion bonding. Alternatively, the ionic layer 12 may be grown on the nonionic layer 14 by an epitaxial or layer-growth method. In one preferred embodiment, the nonionic layer 14 is a yttrium aluminum garnet (YAG) layer and the ionic layer 12 is an ion-doped YAG layer such as ytterbium ion-doped YAG ("Yb:YAG"). Alternatively, materials doped with neodymium (Nd), erbium (Er), or other laser-active rare earth ions may be used. The doping concentration for Yb in the Yb:YAG layer may range from about 0% to 100% Yb by atomic proportion to yttrium, with a doping concentration of about 15% Yb being particularly effective for efficient conversion of optical pumping energy into laser light output.

The nonionic layer 14 is shaped such that any cross-section through the optical-quality interface 16 and the nonionic layer 10 in a direction perpendicular to the optical-quality interface 16 (i.e., any cross-section parallel to the z axis shown in FIG. 1 and passing through both the optical-quality interface 16 and a bottom surface 18 of the laser slab 10) is trapezoidal. Likewise, where a top surface 20 of the laser slab 10 is parallel to the optical-quality interface 16, any cross-section parallel to the z axis and passing through both the top surface 20 and the bottom surface 18 of the laser slab is trapezoidal. Alternatively, the ionic layer 12 may be a rectangular prism attached to the nonionic layer 14, so that only cross-sections through the nonionic layer 14 are trapezoidal.

End surfaces 22 and side surfaces 24 of the laser slab 10 are tilted at angles with respect to the bottom surface 18. A first angle, θ1, is the angle between the bottom surface 18 and the end surfaces 22 of the laser slab 10, and a second angle, θ2, is the angle between the bottom surface 18 and the side surfaces 24 of the laser slab 10.

The laser slab 10 has an overall thickness, t, which is the sum of the thickness of the ionic layer 12, t1, and the thickness of the nonionic layer 14, t2. According to one preferred embodiment, when the slab 10 is made of YAG and Yb:YAG, the overall thickness of the laser slab 10, t, is about 3.5 mm, with the thickness of the ionic layer 12, t1, being about 0.25 mm and the thickness of the ionic layer 14, t2, being about 3.25 mm. Along its bottom surface 18, the laser slab 10 has a length 11 computed by:

$$l_1 = 6\frac{t}{\tan\theta_1}.$$

For example, when t is 3.5 mm and θ1 is 30.96°, $$l_1 = 6\frac{3.5 \text{ mm}}{\tan 30.96°} \approx 35.00 \text{ mm}.$$

Along the top surface 20, the laser slab 10 has a length 12 computed by:

$$l_2 = 4\frac{t}{\tan\theta_1}.$$

For example, when t is 3.5 mm and θ1 is 30.96°, $$l_2 = 4\frac{3.5 \text{ mm}}{\tan 30.96°} \approx 23.34 \text{ mm}.$$

Figure 2:
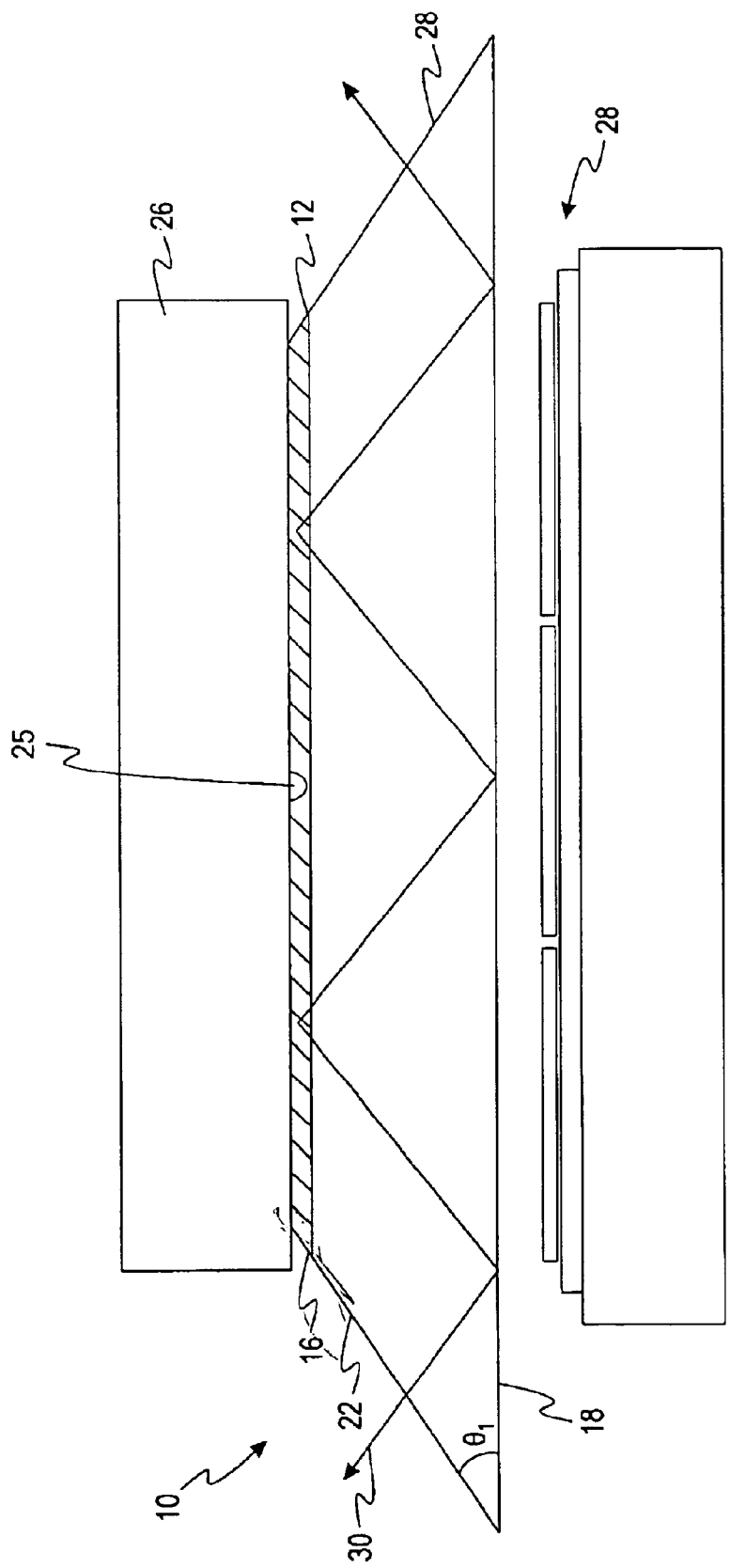
FIG. 2 is a cross-sectional view of a laser slab according to the present invention taken along the line A—A shown in FIG. 1, further showing an optical energy source and heat removal means.

Turning now to FIG. 2, a vertical cross-section along the lines A—A of FIG. 1 displays a conductive heatsink 26 and a diode array 28. In one embodiment, the diode array 28 produces an output wavelength of about 940 nm, which is approximately the wavelength at which peak absorption of the Yb:YAG will occur. If other ionic layers are used, the diode array 28 is selected so as to produce an output wavelength that achieves maximum absorption in the ionic layer 12. In operation, the diode array 28 pumps optical energy into the laser slab 10 from the bottom surface 18. The input light is absorbed at the ionic layer 12, causing an emission of energy from the ionic layer 12 that reflects off the top and bottom surfaces of the laser slab 10 and is emitted from the end surfaces 22. In the embodiment where the diode array 28 has an input wavelength of about 940 nm and the ionic layer 12 is Yb:YAG, the output beam 30 has a wavelength of about 1030 nm.

The ionic layer 12 may be provided with an isolation groove 25, which serves to reduce optical path lengths through the ionic layer 12, thereby reducing parasitic oscillation within the ionic layer 12.

In a laser slab 10 having the dimensions described above, the laser light which becomes the output beam 30 makes five total internal reflection (TIR) bounces within the laser slab 10. Two of these bounces are within the ionic layer 12 and three are within the nonionic layer 14.

The end surfaces 22 of the laser slab 10 are preferably polished to a laser grade polish, with a flatness of about 0.1 wave over the central 80% of the apertures, a scratch-dig of about 10–5, and a parallelism of about 2 arc minutes. The bottom surface 18 and the top surface 20 of the laser slab 10 are polished to a flatness of about 1 wave per 100 mm of length with a scratch-dig of about 20-10 and a parallelism of less than about 10 arc seconds.

Figure 3:
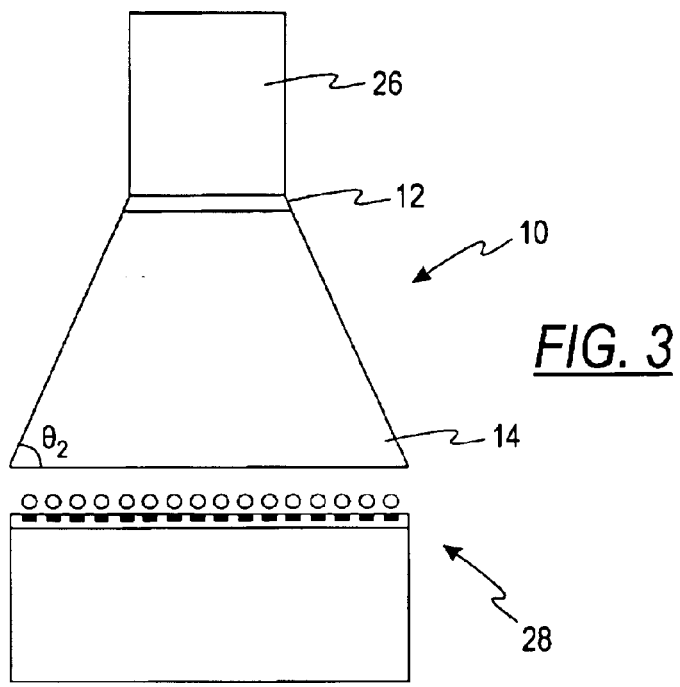
FIG. 3 is a cross-sectional view of a laser slab according to the present invention taken along the line B—B shown in FIG. 1, further showing an optical energy source and heat removal means.

Turning now to FIG. 3, a cross-sectional view of the laser slab 10 along the line B—B of FIG. 1 is shown. In this view, looking along the x-axis of FIG. 1, the trapezoidal shape of the laser slab 10 in the cross-section along the line B—B is visible. The trapezoidal shape increases the optical pumping energy input into the ionic layer 12, while the thinness of the ionic layer 12 allows heat to be efficiently removed from the top surface 20 of the laser slab 10. Further, this arrangement allows output light to be emitted from both end surfaces 22 of the laser slab 10. The second angle, θ2, provides more bottom surface area in the nonionic layer 14 as opposed to the ionic layer 12, allowing more light to enter the laser slab 10 so that optical energy is focused on the ionic layer 12.

In one tested configuration of the laser slab 10, along the bottom surface 18 of the laser slab 10, the laser slab 10 has a width, w1, of about 7.5 mm, and along the top surface 20 of the laser slab 10, the laser slab 10 has a width, w2, of about 3.5 mm. When w1 is approximately 7.5 mm and w2 is approximately 3.5 mm, the angle θ2 between the bottom surface 18 and a side surface 24 of the laser slab 10 is approximately 60.25°. In this configuration, the bottom surface 18 of the laser slab 10 has a surface area of about 263 mm2, and the top surface 20 of the laser slab 10 has a surface area of about 81.69 mm2, with the optical-quality interface 16 having a surface area slightly greater than the surface area of top surface 20. The ratio of the surface area of the bottom surface 18 to the surface area of the optical-quality interface 16 in a laser slab 10 with these dimensions is about 3:1. In this tested configuration, with the thickness t1 of the ionic layer 12 being about 0.25 mm and the doping concentration of Yb in the ionic layer 12 being about 15%, a peak single-pass gain of at least 1.37 after 1.3 ms of pumping was achieved. In this configuration, greater or lesser concentrations of Yb in the ionic layer 12 and greater or lesser thicknesses t1 of the ionic layer were found to degrade the gain.

Figure 4:
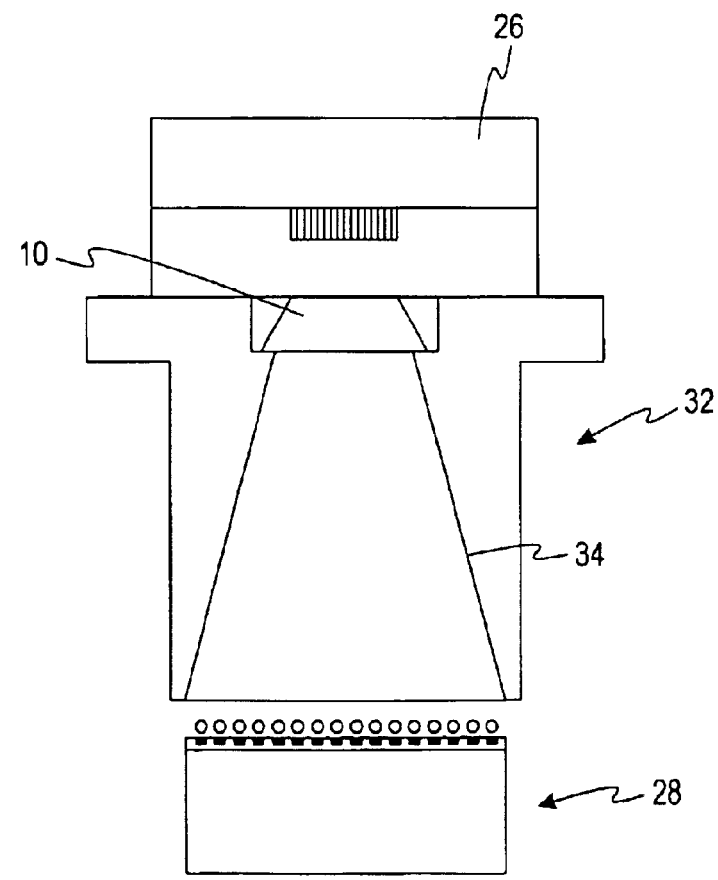
FIG. 4 is a cross-sectional view of a laser slab according to the present invention taken along the line B—B shown in FIG. 1, further showing an optical energy source, heat removal means, and a tapered duct.

Turning now to FIG. 4, a cross-sectional view of a laser slab 10 and a diode array 28 using a duct concentrator 32 is shown. The duct concentrator 32 concentrates input optical energy from the diode array 28 into the laser slab 10. The duct concentrator 32 may be provided with a trapezoidal cross-section as shown in FIG. 4 with inner walls that are diamond-machined, gold-plated and polished.

In one embodiment of the present invention, the heatsink 26 is a high intensity pin-fin heat exchanger bonded to the ionic layer 12 with a high-thermal-conductivity room-temperature vulcanized (RTV) rubber material. In this embodiment, coolant flow through the heatsink at 0.85 gallons per minute with a coolant temperature of about 15° C. results in adequate heat removal from the laser slab 10 during operation. The thinness of the ionic layer 12 contributes to easy heat removal from the ionic layer while also providing a high-quality output beam 30. In an alternative embodiment, the heatsink 26 may be low-temperature soldered to the ionic layer 12. Further, alternative heat removal means such as impingement coolers, microchannel coolers, and other types of compact high-intensity coolers may be employed in the present invention.

Figure 5:
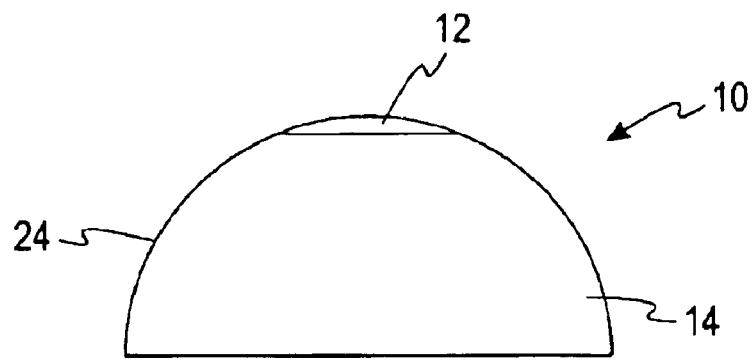
FIG. 5 is a cross-sectional view of a laser slab according to one embodiment of the present invention having a semi-circular cross section.
Figure 6:
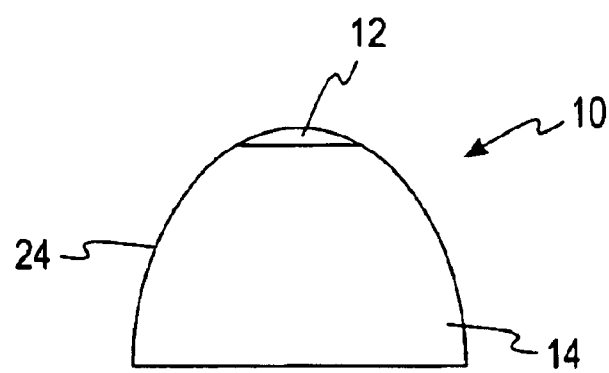
FIG. 6 is a cross-sectional view of a laser slab according to one embodiment of the present invention having a parabolic cross section.

Alternative constructions for a laser slab 10 which serve to funnel optical energy to the ionic layer 12 similarly to the trapezoidal formation discussed above are possible. For example, a laser slab 10 may be constructed with a semi-circular or parabolic cross-section along the line B—B of FIG. 1. FIG. 5 shows a laser slab 10 constructed with a semi-circular cross-section, and FIG. 6 shows a laser slab 10 constructed with a parabolic cross-section. Total internal reflections off the side walls 24 of nonionic layers 14 having such a cross-sections would tend to guide pump energy into the ionic layers 12.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An optically-pumped laser device, comprising:
    a nonionic base layer having an upper surface and a lower surface, a surface area of said lower surface being greater than a surface area of said upper surface;
    an ionic layer having a top surface and a bottom surface, said bottom surface being attached to said upper surface of said nonionic base layer through an optical-quality interface, a cross-section through said device in a direction perpendicular to said interface having a trapezoidal shape, parallel lines of said trapezoidal shape being parallel to said interface; and
    wherein output energy from said laser device makes multiple reflections between said top surface of said ionic layer and said lower surface of said nonionic base layer such that said output energy makes multiple passes through said optical-quality interface.

2. The laser device of claim 1, wherein said optical-quality interface is a diffusion-bonded interface.

3. The laser device of claim 1, wherein said optical-quality interface is a layer-growth type interface.

4. The laser device of claim 1, wherein said nonionic layer is a YAG layer and said ionic layer is a Yb:YAG layer having a ytterbium concentration of about 15%.

5. The laser device of claim 1, wherein said ionic layer has an isolation groove.

6. The laser device of claim 1 wherein said laser device comprises first and second side surfaces and first and second end surfaces, said first and second end surfaces extending from said top surface of said ionic layer to said lower surface of said nonionic base layer, said laser device accepting input optical energy through said lower surface of said nonionic base layer and directing said input optical energy to said ionic layer such that said output energy is produced in said ionic layer, reflected between said top surface of said ionic layer and said lower surface of said nonionic layer, and emitted from said first and second end surfaces.

7. The laser device of claim 1, wherein all cross-sections passing through said optical-quality interface in a direction perpendicular to said interface have a trapezoidal shape.

8. The laser device of claim 1, wherein said nonionic layer and said ionic layer form a laser slab, said laser slab having a bottom surface and two side surfaces, an angle between said side surfaces and said bottom surface being about 60°.

9. An optically-pumped laser device, comprising:
    a nonionic base layer; and
    an ionic layer attached to said nonionic base layer through an optical-quality interface, a cross-section through said device in a direction perpendicular to said interface having a trapezoidal shape, wherein all cross-sections passing through said optical-quality interface in a direction perpendicular to said interface have a trapezoidal shape.

10. An optically-pumped laser device, comprising:
    a nonionic base layer;
    an ionic layer attached to said nonionic base layer through an optical-quality interface, said nonionic base layer and said ionic layer form a laser slab;
    a bottom surface located on said nonionic base layer;
    a top surface located on said ionic surface said optical-quality interface being located between said top surface and said bottom surface output energy of said laser device reflecting between said bottom surface and said top surface such that said output energy passes through said optical-quality interface; and
    two side surfaces extending between said top and bottom surfaces, an angle between said side surfaces and said bottom surface being about 60° such that a cross-section through said device in a direction perpendicular to said optical-quality interface has a trapezoidal shape.

11. An optically-pumped laser slab, comprising:
    a YAG layer;
    a Yb:YAG layer attached to said YAG layer along optical-quality interface by diffusion bonding, said Yb:YAG layer having a ytterbium concentration of approximately 15%, a cross section through said laser slab in any plane perpendicular to said optical-quality interface having a trapezoidal shape;
    a bottom surface;
    a top surface opposite said bottom surface, said optical-quality interface being between said top and bottom surfaces, output energy of said laser slab reflecting between said bottom surface and said top surface such that said output energy passes through said optical-quality interface; and
    two side surfaces extending to said top surface from said bottom surface, each of said side surfaces being at an angle of about 60° with respect to said bottom surface.

12. The laser slab of claim 11 wherein said Yb:YAG layer comprises said top surface, said YAG layer comprises said bottom surface, and further including first and second end surfaces, said laser slab accepting input optical energy through said bottom surface of said YAG layer and directing said input optical energy to said Yb:YAG layer such that output energy is produced by said Yb:YAG layer, reflected between from said top surface of said Yb:YAG layer and said bottom surface of said YAG layer, and emitted in an output beam from said first and second end surfaces.

13. A laser slab for use in an optically-pumped laser, comprising:
    a nonionic layer having a bottom surface and side surfaces; and
    an ionic layer attached to said nonionic layer along an interface, the bottom surface of said nonionic layer having a bottom surface area greater than an interface surface area of said interface, said side surfaces of said nonionic layer funneling optical energy from said bottom surface of said nonionic layer to said interface;
    wherein said laser slab comprises first and second side walls comprising said side surfaces of said nonionic layer and first and second end surfaces extending between said side walls such that light energy entering said laser slab through said bottom surface of said nonionic layer results in emitted energy from said ionic layer reflecting at least once from said bottom surface of said nonionic layer and resulting in an output beam emitted from said end surfaces.

14. The laser slab of claim 13, wherein said surface area of said bottom surface is at least about two times greater than said interface surface area.

15. The laser slab of claim 13, wherein a cross-section through said nonionic layer in a direction perpendicular to said interface is trapezoidal.

16. The laser slab of claim 13, wherein said side walls are so shaped as to provide rounded profiles in a cross-section in a direction perpendicular to said interface.

17. The laser slab of claim 13, wherein said side walls are so shaped as to provide parabolic profiles in a cross-section in a direction perpendicular to said interface.

18. The laser slab of claim 13, wherein said ionic layer has an isolation groove.

19. An optically-pumped laser device, comprising:

a nonionic base layer having a thickness of about 3.25 mm; and an ionic layer attached to said nonionic base layer through an optical-quality interface and having a thickness of about 0.25 mm, a cross-section through said device in a direction perpendicular to said interface having a trapezoidal shape.

20. An optically pumped laser device comprising:

a nonionic base layer having a bottom surface for accepting input optical energy;

an ionic layer adapted to accept said input optical energy and emit output optical energy, said ionic layer being attached to said nonionic base layer along an optical-quality interface, said ionic layer having a top surface opposing said bottom surface of said nonionic base layer; and first and second side surfaces and first and second end surfaces, each of said first and second side surfaces and said first and second end surfaces extending between said bottom surface of said nonionic layer and said top surface of said ionic layer, said first and second side surfaces and said first and second end surfaces being provided at angles with respect to said bottom surface of said nonionic base layer such that a surface area of said optical interface is less than a surface area of said bottom surface of said nonionic base layer and cross-sections through said nonionic base layer and perpendicular to said optical-quality interface are trapezoidal, said output optical energy reflecting from said top surface of said ionic layer and said bottom surface of said nonionic layer and being emitted from said end surfaces.

* * * * *